(12) United States Patent
Kachant

(10) Patent No.: US 9,153,038 B2  
(45) Date of Patent: Oct. 6, 2015

(54) METHOD FOR CARRYING OUT A DYNAMIC RANGE COMPRESSION IN TRAFFIC PHOTOGRAPHY

(71) Applicant: JENOPTIK Robot GmbH, Monheim am Rhein (DE)

(72) Inventor: Ralf Kachant, Duesseldorf (DE)

(73) Assignee: JENOPTIK Robot GmbH, Monheim am Rhein (DE)

( * ) Notice: Subject to any disclaimer, the term of this patent is extended or adjusted under 35 U.S.C. 154(b) by 0 days.

(21) Appl. No.: 14/357,709

(22) PCT Filed: Nov. 10, 2012

(86) PCT No.: PCT/DE2012/100345  
§ 371 (c)(1),  
(2) Date: May 12, 2014

(87) PCT Pub. No.: WO2013/068006  
PCT Pub. Date: May 16, 2013

(65) Prior Publication Data  
US 2014/0355875 A1  Dec. 4, 2014

(30) Foreign Application Priority Data  
Nov. 11, 2011  (DE) .......................... 10 2011 055 269

(51) Int. Cl.  
G06T 9/00 (2006.01)  
H04N 19/117 (2014.01)  
H04N 19/136 (2014.01)  
H04N 19/186 (2014.01)  
H04N 19/182 (2014.01)  
H04N 19/98 (2014.01)  
H04N 9/64 (2006.01)

(52) U.S. Cl.  
CPC  *G06T 9/00* (2013.01); *H04N 9/646* (2013.01); *H04N 19/117* (2013.01); *H04N 19/136* (2013.01); *H04N 19/182* (2013.01); *H04N 19/186* (2013.01); *H04N 19/98* (2013.01)

(58) Field of Classification Search  
None  
See application file for complete search history.

(56) References Cited

U.S. PATENT DOCUMENTS

| | | | |
|---|---|---|---|
| 6,741,753 B1 | 5/2004 | Moroney | |
| 8,174,542 B2 * | 5/2012 | Mori | 345/690 |
| 8,582,914 B2 * | 11/2013 | Tezaur | 382/263 |
| 8,737,758 B2 * | 5/2014 | Kim et al. | 382/260 |

(Continued)

OTHER PUBLICATIONS

Wikipedia, HSL and HSV, Oct. 21, 2011.*

(Continued)

*Primary Examiner* — Bhavesh Mehta  
*Assistant Examiner* — Feng Niu  
(74) *Attorney, Agent, or Firm* — Muncy, Geissler, Olds & Lowe, P.C.

(57) ABSTRACT

The invention relates to a method for carrying out a dynamic range compression in traffic photography for representation having greater detail fidelity in images created in connection with traffic monitoring installations. The problem addressed by the invention is that of finding a possibility for achieving, in the case of digitally obtained images in traffic photography, whilst precluding the different subjective influences on the part of the processing personnel, a representation of the dark regions with greater detail fidelity, without the information of the brighter regions being lost in the process. According to the invention, this problem is solved by means of a method for carrying out a specific dynamic range compression in traffic photography.

18 Claims, 2 Drawing Sheets

(56) References Cited

U.S. PATENT DOCUMENTS

2007/0041636 A1 2/2007 Yoon et al.
2007/0279500 A1 12/2007 Castorina et al.
2009/0161953 A1* 6/2009 Ciurea et al. ............... 382/172
2012/0057796 A1* 3/2012 Kim et al. .................... 382/199

OTHER PUBLICATIONS

Nathan Moroney, "Local Color Correction Using Non-Linear Masking," Proc. of the Eighth IS&T/SD Color Imaging Conference, pp. 108-111 (Nov. 7, 2000).

Danny Odental, "Dynamic range reduction in digital traffic photography by non-linear filtering in a Laplacain Pyramid," Thesis at the Dept. of Imaging Sciences and Media Tech. at the Univ. of Applied Sciences, Cologne, pp. 1-48 and 60-72, http://opus.bibl.fh-koeln.de/volltexte/2009/238/pdf/Odenthal_Danny.pdf, (Dec. 21, 2004).

Zhang et al., "An Adaptive Tone Mapping Algorithm for High Dynamic Range Images," Proc. of the Second Int'l Workshop on Computational Color Imaging, pp. 207-215 (Mar. 6, 2009).

Ohta et al., "Color Information for Regional Segmentation," Comp. Graph. & Image Proc., vol. 13, No. 3, pp. 222-241 (Jul. 3, 1980).

J.C. Russ, "Color Spaces," *The Image Processing Handbook*, CRC Press, Boca Raton, FL, pp. 40-43 (2002).

\* cited by examiner

Fig. 2

16 bit grayscale image [F] with $x_{Fi}$ $i = 1,...,9$
$n = 3$
$m = 3$

Copy → 16 bit grayscale image (grayscale image mask) [G] with $x_{Gi}$

Mean value
$$\bar{x} = \frac{1}{n*m} * \sum_{i=1}^{n*m}(x_{Gi})$$

Blurring / Blurring filter f(b)

Blurring factor $b = 4 * \bar{x}$

Gain parameter $p = 10 + \left(\frac{3000}{55 + \bar{x}}\right)$

Blurred 16 bit grayscale image (contrast mask) [U] with $x_{Ui}$

Exponent
$$y_{Ui} = 10^{\left|\frac{p}{30}(2x_{Ui} - 1)\right|}$$

$x_{Ui} < 0.5$: $x_{Ni} = 1 - (1 - x_{Fi})^{y_{Ui}}$ $x_{Ui} \geq 0.5$: $x_{Ni} = x_{Fi}^{y_{Ui}}$ New 16 bit grayscale image [N] with $x_{Ni}$

METHOD FOR CARRYING OUT A DYNAMIC RANGE COMPRESSION IN TRAFFIC PHOTOGRAPHY

This nonprovisional application is a National Stage of International Application No. PCT/DE2012/100345, which was filed on Nov. 10, 2012, and which claims priority to German Patent Application No. 10 2011 055 269.3, which was filed in Germany on Nov. 11, 2011, and which are both herein incorporated by reference.

BACKGROUND OF THE INVENTION

1. Field of the Invention

The invention relates to a method for carrying out a dynamic range compression in traffic photography for representation having greater detail fidelity in images created in association with traffic monitoring installations.

2. Description of the Background Art

In traffic photography, for the most part images are created in which the driver in the vehicle cabin appears very dark, whereas the license plate appears strongly over-illuminated owing to its retroreflective property. A dynamic range compression can often be successfully applied in order to brighten up the dark regions in images with a high dynamic range, and to improve the visibility of low contrast details in said regions without destroying the information in the brighter regions. In this case, a copy of the image is converted into a contrast mask over which the image is superposed. In the process, brightness and contrast must be manually matched for each image so that the images thus corrected do not appear unnatural, or even like a photomontage.

When the images from the traffic monitoring installations come to be evaluated in the evaluation offices (backoffices) of the authorities or commissioned organizations, there is a need for daily manual matching of several thousand images, something which entails a considerable extra outlay in time, but also an additional burden on the staff. In extreme cases, fines can be time barred when a blockage results in the processing of the images. Furthermore, the manual matching is open to the subjective influences of the respective person who is processing the image.

SUMMARY OF THE INVENTION

It is therefore an object of the present invention to find an option to achieve a representation having greater digital fidelity of the dark regions in the case of digitally obtained images of traffic photography whilst precluding the different subjective influences from the processing staff, without losing the information of the brighter regions in the process.

According to the invention, this object is achieved by a method for carrying out a dynamic range compression in traffic photography. Proceeding from a digitally provided original image having the pixels $x_{Fi}$, subdivided into n columns s and m rows z:

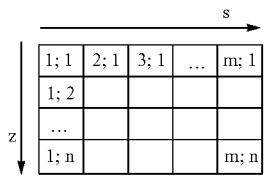

the first step is to create a grayscale image mask [G] having grayscale values $G(S_{i1};Z_{i2})$, wherein $i_1=\{1,\ldots,m\}$ and $i_2=\{1,\ldots,n\}$. In the further method cycle, the arithmetic mean value over all the grayscale values $G(S_{i1};z_{i2})$ is firstly determined and calculated in accordance with $$\bar{g} = \frac{1}{n*m} * \sum_{i1=1}^{m} \sum_{i2=1}^{n} G(s_{i1}; z_{i2}).$$

Since the mean value $\bar{g}$ is only an arithmetic mean value $\bar{x}$, it is also possible in order for the purpose of simplification to sum all the pixels $x_{Gi}$ of the grayscale image mask with $i=\{1,\ldots,n*m\}$ and calculate in accordance with the following formula:

$$\bar{x} = \frac{1}{n*m} * \sum_{i=1}^{n*m} (x_{Gi}).$$

A gain parameter p and a blurring factor b are then determined from the arithmetic mean value $\bar{x}$. Subsequently, a blurred grayscale image (contrast mask) [U] having the grayscale values $x_{Ui}$ is created by blurring with the aid of the blurring factor b in order, finally, to generate the desired new image [N] having the pixels $x_{Ni}$ by superimposing the original image [F] having the pixels $x_{Fi}$ with the blurred grayscale image (contrast mask) [U] having the pixels $x_{Ui}$ while applying the gain parameter p and an exponent $v_{Ui}$.

The particular advantage of the inventive method consists in that the dark regions are automatically brightened up, particularly in the case of color images with a high dynamic range, in order firstly to improve the visibility of invisible details in said regions, but without destroying the information in the brighter regions. This is particularly advantageous in traffic photography, since the driver is mostly imaged very darkly, while the license plate is strongly over-illuminated, given its retroreflective properties. This method can be applied both in the camera directly after the acquisition in such a way that all the original images are automatically brightened up, or the time delay after which the acquired original images have been stored on a storage medium. The time-delayed brightening up can be performed in the camera at an instant when no original images are being acquired, or on a separate computer unit, for example on a computer in a backoffice.

Starting point for the method can be both a monochrome grayscale image [F] and a color image [F] having the usual 3 channels (RGB). In the case of the color images, the grayscale image mask with its grayscale values $x_{Gi}$ is generated by converting the individual R, G and B pixels as follows:

$$x_{Gi} = \frac{R_i + G_i + B_i}{3}.$$

During the final generation of the new color image [N], each pixel is then split up again into an R, G and B pixel.

In order largely to suppress rounding errors, it is advantageous for the computer, which is usually set to fixed point arithmetic, to be converted to floating point arithmetic.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2 shows a flowchart of the method with the aid of a monochrome original image.

DETAILED DESCRIPTION

Figure 1:
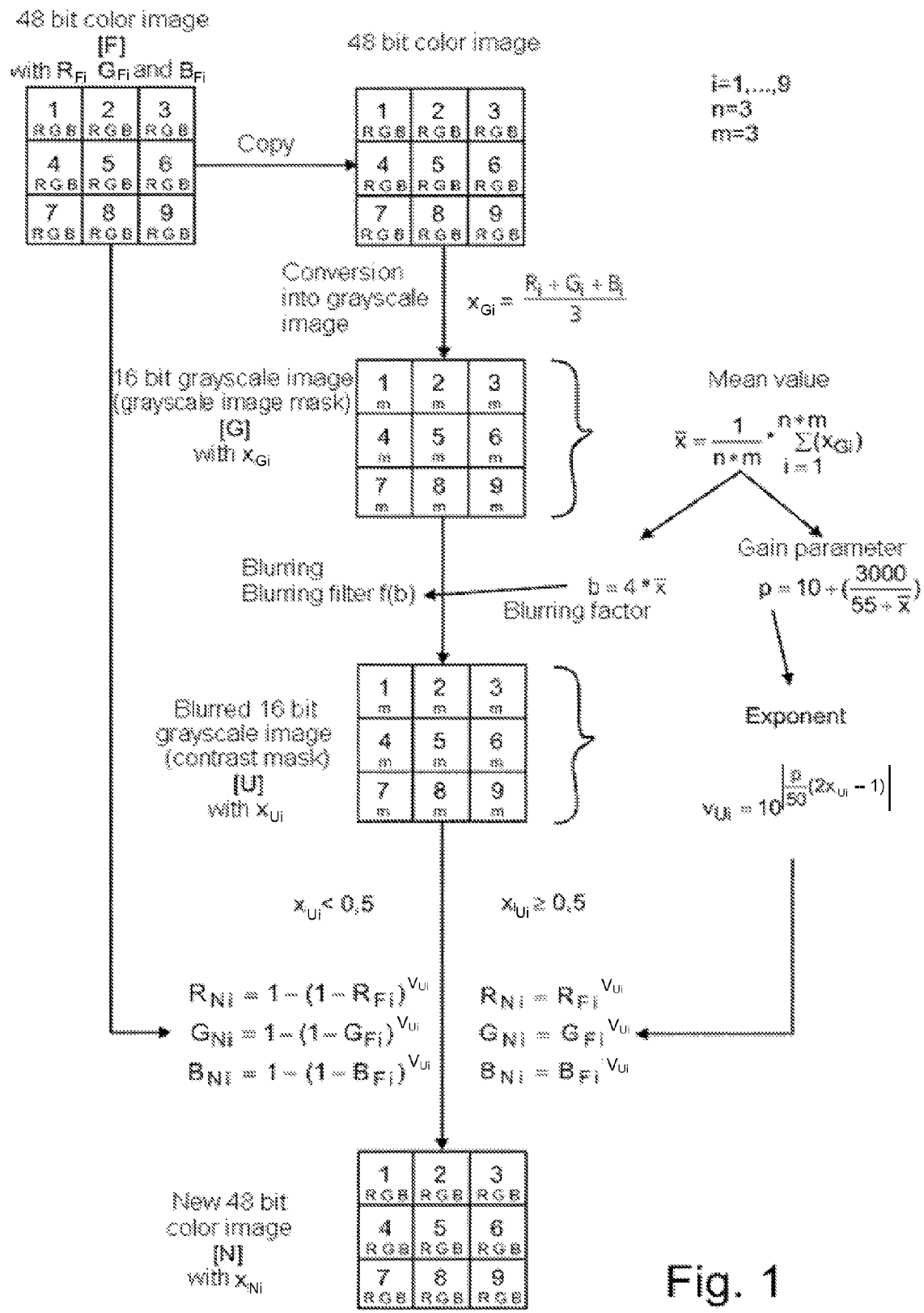
FIG. 1 shows a flowchart of the method with the aid of a color image.

Since all current computers use so-called floating point arithmetic, at the start of the method all the color values are converted from fixed point arithmetic (integer) into floating point arithmetic, that is to say floating point numbers, in order to keep rounding errors as low as possible in the computational steps.

For the conversion into a floating point number, each individual R,G and B value for each 48-bit pixel is respectively divided by 65,536.0, which corresponds to $2^{16}$:

$$\text{Int} \to \text{floating point}$$
$$X_i \to \frac{X_i}{65,536.0}.$$

In the first step, a grayscale image mask [G] having the grayscale values $x_{Gi}$, wherein $i=1, \ldots, n*m$, is firstly created from a digitally provided original image [F] having the pixels $x_{Fi}$ with $i=1, \ldots, n*m$. The starting point for the method can be both a monochrome grayscale image [F] and a color image [F] having the usual 3 channels (RGB).

In the case of a color image [F], there is an $R_i$-, $G_i$- and $B_i$-value for each pixel $x_{Fi}$. The $R_i$-, $G_i$- and $B_i$-values represent a value triplet for each pixel. By contrast, there is only a single grayscale value for each $x_{Fi}$ in the case of a monochrome original image.

In the case of a monochrome original image [F], only a copy of the original image [F] is generated; it then corresponds to the grayscale image mask [G].

By contrast, in the case of a color original image the color image [F] is firstly converted into a monochrome image. For this purpose, a copy of the original image [F] is firstly generated from the color image [F] and subsequently converted into a monochrome image [G]. For this purpose, the grayscale image [G] with its grayscale values $x_{Gi}$ is generated by converting the individual R, G and B pixels as follows:

$$\text{grayscale values } x_{Gi} = \frac{R_i + G_i + B_i}{3},$$

so that the calculated brightness values are subsequently assigned as grayscale values to the corresponding pixels $x_{Gi}$ of the grayscale image [G] to be generated.

In the second step, the arithmetic mean value $\overline{x}$ over all the grayscale values $x_{Gi}$, with $i=1, \ldots, n*m$, calculated is determined or calculated from the grayscale image [G] which was copied from a monochrome original image [F] or generated from a color image [F]:

$$\text{arithmetic mean value } \overline{x} = \frac{1}{n*m} * \sum_{i=1}^{n*m}(x_{Gi}).$$

In the third step, a blurred grayscale image for later use is generated by applying a blurring filter. The blurring filter (for example a Gaussian filter) in this case reduces the difference in the grayscale values (contrast) between adjacent points. Since it is a lowpass filtering, small structures are lost, whereas large ones are retained.

A common blurring filter is a Gaussian filter in the case of which, given a two-dimensional image by $x_{ui}=h(x,y)$, the grayscale value of each pixel of the contrast mask $x_{ui}$ describes by the following formula:

$$h(x, y) = \frac{1}{2\pi\sigma^2} e^{-\frac{x^2+y^2}{2\sigma^2}}$$

With reference to the inventive method, this means that s is to be used for x, z for y and b for σ. Here, b is the blurring factor, which is calculated from the arithmetic mean value $\overline{x}$ of the grayscale image [G] using the following formula $$b=4*\overline{x},$$

the functional relationships being determined empirically from a plurality of image rows having different illumination situations. A two-dimensional filter $H(x,y)$ can be separated into two one-dimensional filters $H(x)$ and $H(y)$ in order to reduce the outlay on computation. Consequently, said filter is applied, for example, only to the direct neighbor, on the one hand in the horizontal and on the other hand in the vertical, and thus reduces the outlay on computation by a multiple.

Consequently, each grayscale value $x_{ui}$ with $i=1, \ldots, n*m$ results for each point of the contrast mask [U] through application of the Gaussian filter to each point $x_{Gi}$ with $i=1, \ldots, n*m$, with account being taken of the contrast values of the respective adjacent points of the grayscale image [G].

In the fourth step, the original image [F] is balanced with the blurred grayscale image [U] (contrast mask) pixel by pixel. The balancing is performed as a function of a gain parameter p, determined once for all computations of an image, and the pixel dependent parameter $x_{ui}$, which both feature in the exponents specific to each pixel. The natural impression is retained in the new generated image [N] owing to this type of balancing.

The first step in this regard is to calculate the gain parameter p with the aid of $$p = 10 + \left(\frac{3000}{55+\overline{x}}\right),$$

while using the arithmetic mean value $\overline{x}$.

Subsequently, the pixels R, G and B of the new color image [N] are determined as follows for each individual pixel of the $R_i$-, $G_i$- and $B_i$-value with $i=1, \ldots, n*m$:

for the case when $x_{ui}<0.5$:

$$R_{Ni}=1-(1-R_{Fi})^{v_{Ui}}$$

$$G_{Ni}=1-(1-G_{Fi})^{v_{Ui}}$$

$$B_{Ni}=1-(1-B_{Fi})^{v_{Ui}}$$

for the case when $x_{ui}\geq 0.5$:

$$R_{Ni}=R_{Fi}^{v_{Ui}}$$

$$G_{Ni}=G_{Fi}^{v_{Ui}}$$

$$B_{Ni}=B_{Fi}^{v_{Ui}},$$

the exponent being calculated in both cases pixel by pixel as follows:

$$v_{Ui} = 10^{\left|\frac{p}{50}(2x_{ui}-1)\right|}$$

and in this case $x_{ui}$ are the values of the blurred grayscale image (contrast mask), and p is the gain parameter which has been calculated by applying the arithmetic mean value $\overline{x}$.

The dark parts of the image are enhanced in this case without too great a change to the bright image parts.

Finally, the floating point numbers of the R, G and B values are reconverted back into an integer for each pixel by means of multiplication by 65,536.0:

Floating point → Int $$\rightarrow x * 65{,}536.0.$$

The method cycles explained in more detail above are schematically illustrated in a self-explanatory fashion in FIGS. 1 and 2, the starting point being a color image in FIG. 1, and a monochrome image in FIG. 2.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for carrying out a dynamic range compression in traffic photography, proceeding from a digitally provided original image having n*m pixels, the method comprising:
   creating a grayscale image mask having grayscale values $x_{Gi}$ from the original image, wherein i =1,. . ., n*m;
   calculating an arithmetic mean value using:

$$\bar{x} = \frac{1}{n*m} * \sum_{i=1}^{n*m} (x_{Gi}),$$

determining a gain parameter p and a blurring factor b, wherein the blurring factor is proportional to the arithmetic mean value $\bar{x}$
   creating a blurred grayscale image having grayscale values $x_{ui}$ by blurring the grayscale values $x_{Gi}$ with the aid of the blurring factor; and
   creating a new image by superimposing the original image with the blurred grayscale image while applying the gain parameter.

2. The method as claimed in claim 1, wherein, when use is made of a monochrome original image the created grayscale image mask is a copy of the original image.

3. The method as claimed in claim 1, wherein when use is made of an original image formed of R, G and B pixels, the grayscale image mask is created by calculating the grayscale values $x_{Gi}$ by:

$$x_{Gi} = \frac{R_i + G_i + B_i}{3}.$$

4. The method as claimed in claim 1, wherein the blurring factor is calculated by:

$$b = 4 * \bar{x}_1$$

wherein b is the blurring factor and $\bar{x}$ is the arithmetic mean value.

5. The method as claimed in claim 1, wherein the gain parameter is calculated by:

$$p = 10 + \left(\frac{3000}{55 + \bar{x}}\right).$$

wherein p is the gain parameter and $\bar{x}$ is the arithmetic mean value.

6. The method as claimed in claim 1, wherein the blurring factor is applied to the grey scale values using a blurring filter.

7. The method as claimed in claim 6, wherein the blurring filter is a Gaussian filter or a low-pass filter.

8. The method as claimed in claim 6, wherein the blurring filter is two dimensional.

9. The method as claimed in claim 6, wherein the blurring filter comprises two one dimensional filters, and wherein one of the two one dimensional filters being applied to a plurality of rows of greyscale values and the other of the two one dimensional filters being applied to a plurality of columns of greyscale values.

10. The method as claimed in claim 6, wherein the blurring filter is a function of the blurring factor.

11. The method as claimed in claim 1, wherein the blurred greyscale image and the gain parameter balance a luminance of the original image.

12. The method as claimed in claim 1, wherein the blurring factor represents the standard deviation in a Gaussian filter.

13. The method as claimed in claim 12, wherein the Gaussian filter is applied to blur the greyscale image.

14. The method as claimed in claim 1, wherein the gain parameter p is determined using the arithmetic mean value $\tilde{x}$.

15. The method as claimed in claim 1, wherein the blurring factor blurs the greyscale image.

16. The method as claimed in claim 1, wherein the blurring of the greyscale image generates a contrast mask only for reducing contrast.

17. A method for carrying out a dynamic range compression in traffic photography, proceeding from a digitally provided original image having n*m pixels, the method comprising:
   creating a grayscale image mask having grayscale values $x_{Gi}$ from the original image, wherein i =1,. . ., n*m;
   calculating an arithmetic mean value using:

$$\bar{x} = \frac{1}{n*m} * \sum_{i=1}^{n*m} (x_{Gi}),$$

determining a gain parameter p and a blurring factor b;
   creating a blurred grayscale image having grayscale values $x_{ui}$ by blurring the grayscale values $x_{Gi}$ with the aid of the blurring factor; and
   creating a new image by superimposing the original image with the blurred grayscale image while applying the gain parameter, wherein new pixels $x_{Ni}$ are determined for $x_{ui}$ <0.5 by:

$$x_{Ni} = 1 - (1 + x_{Fi})^{v_{ui}},$$

and for $x_{ui} \geq 0.5$ by:

$$x_{Ni} = x_{Fi}^{v_{ui}},$$

wherein $$v_{Ui} = 10^{\left|\frac{p}{50}(2x_{ui}-1)\right|}.$$

18. A method for carrying out a dynamic range compression in traffic photography, proceeding from a digitally provided original image having n*m pixels, the method comprising:
   creating a grayscale image mask having grayscale values $x_{Gi}$ from the original image, wherein i =1,. . ., n*m;
   calculating an arithmetic mean value using:

$$\bar{x} = \frac{1}{n*m} * \sum_{i=1}^{n*m} (x_{Gi}),$$

determining a gain parameter p and a blurring factor b;
   creating a blurred grayscale image having grayscale values $x_{ui}$ by blurring the grayscale values $x_{Gi}$ with the aid of the blurring factor; and creating a new image by superimposing the original image with the blurred grayscale image while applying the gain parameter, wherein new pixels $R_{Ni}$, $G_{Ni}$, $B_{Ni}$ are determined for $x_{ui} < 0.5$ by:

$$R_{Ni}=1-(1-R_{Fi})^{v_{ui}} G_{Ni}=1-(1-G_{Fi})^{v_{ui}}, B_{N1}=1(1-_{Fi})^{v_{ui}}, \qquad 5$$

and for $x_{ui} \geq 0.5$ by:
wherein $$v_{Ui} = 10^{\left|\frac{p}{50}(2x_{ui}-1)\right|}. \qquad 10$$

* * * * *